H. NICHOLSON.
PNEUMATIC TIRE.
APPLICATION FILED OCT. 6, 1916. RENEWED JUNE 16, 1919.
1,328,054.
Patented Jan. 13, 1920.
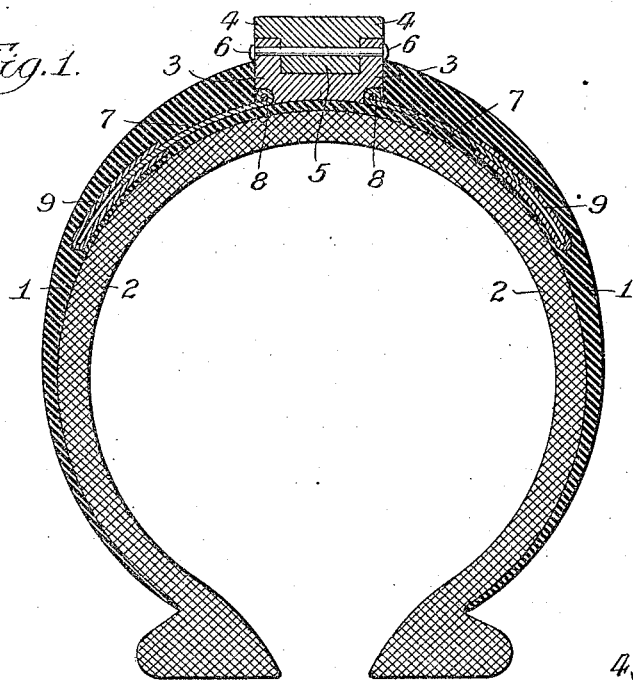
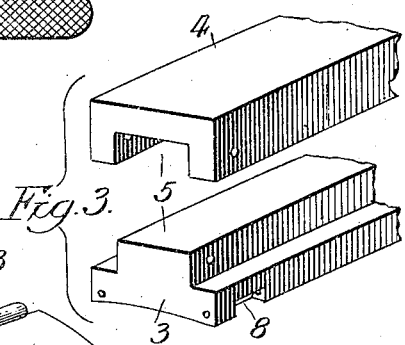
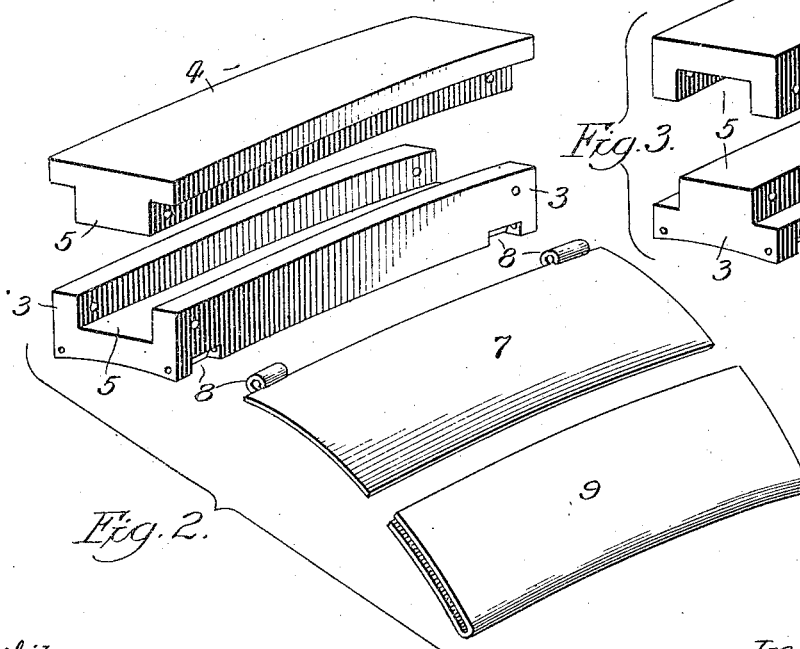
Witness:
John Enders,
Inventor:
Herbert Nicholson,
by Robert Burns,
Atty.

UNITED STATES PATENT OFFICE.

HERBERT NICHOLSON, OF CHICAGO, ILLINOIS.

PNEUMATIC TIRE.

1,328,054. Specification of Letters Patent. Patented Jan. 13, 1920.

Application filed October 6, 1916. Serial No. 124,015. Renewed June 16, 1919. Serial No. 304,738.

*To all whom it may concern:*

Be it known that I, HERBERT NICHOLSON, a citizen of the United States of America, and a resident of Chicago, in the county of Cook, State of Illinois, have invented certain new and useful Improvements in Pneumatic Tires, of which the following is a specification.

This invention relates to that class of attachments for pneumatic and like tires which are located in the crown thereof to render the same puncture proof, wear resisting and non-skidding. And the present improvement has for its object to provide a simple and efficient structural formation and association of parts, whereby the aforesaid functions are attained without material interference with the normal resiliency of the tire, all as will hereinafter more fully appear.

In the accompanying drawings:—

Figure 1, is a transverse section of a pneumatic tire illustrating the general arrangement of parts in the present improvement.

Fig. 2, is a detail perspective view of one unit of the tire attachment with the parts in a detached condition.

Fig. 3, is a similar view illustrating a modified formation.

Similar reference numerals indicate like parts in the several views.

Referring to the drawings, 1 designates the usual outer India rubber portion, and 2 the inner combined canvas and India rubber portion of an ordinary pneumatic tire of the clencher type.

3, 4, designate sectional inner and outer annular members constituting the tread portion of the tire structure. In the present improvement the inner member 3 is formed with a transversely curved inner face or wall and with flat side faces or walls in parallel relation to each other and in approximately right-angle relation to the aforesaid inner face. The tread portion formed by the sections 3, 4, is embedded in the crown of the aforesaid resilient tire portion 1.

The annular members 3, 4, are preferably connected together by an interengaging tongue and groove formation 5 of the contacting faces of said members, as shown in Figs. 1 and 2.

6 designates a bolt or rivet passing transversely through said parts to fasten the same together in an interlocked condition.

7 designates one of the pairs of circularly and laterally disposed anchor plates or sections by which the series of supporting sections 3 are anchored to the wall of the pneumatic tire. In the present improvement the anchor plates 7 are pivotally connected to the supporting sections 3 by hinge connections 8, as shown.

9 designates one of the pairs of circularly and laterally disposed sheaths or sections which are embedded in outer portion 1 of the tire wall, and are of a flat U shape in cross-section as shown, adapted to receive the free end of an individual anchor plate 7 and permit a limited lateral sliding movement of the same in actual use on rough roads.

Any suitable metal or like tough and durable material may be used in the formation of the present improvement, and which from its nature is adapted to provide adhesion against skidding, and toughness to resist puncture and abrasion.

Having thus fully described my said invention, what I claim as new and desire to secure by Letters Patent, is:—

A tire comprising annular tread portions located in the crown of the tire; each tread portion having a pair of circular and laterally disposed anchor plates embedded wholly within said crown and hinged by their outer corners to the inner corners of the tread portions and a pair of circular and laterally disposed sheaths of U-shape in cross-section and also embedded wholly within said crown and receiving the anchor plates.

Signed at Chicago, Illinois, this 2nd day of October, 1916.

HERBERT NICHOLSON.